(12) United States Patent
Alisawi et al.

(10) Patent No.: US 10,693,797 B2
(45) Date of Patent: Jun. 23, 2020

(54) BLOCKING APPLICATION TRAFFIC FOR RESOURCE CONSERVATION IN A MOBILE DEVICE

(71) Applicant: Seven Networks, LLC, Marshall, TX (US)

(72) Inventors: Rami Alisawi, Kerava (FI); Ari Backholm, Los Altos, CA (US); Huajie Hu, Zhejiang (CN); Alexandr Seleznyov, Espoo (FI); Jie Wei, San Carlos, CA (US); Sungwook Yoon, Palo Alto, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 16/395,483

(22) Filed: Apr. 26, 2019

(65) Prior Publication Data

US 2019/0253363 A1 Aug. 15, 2019

Related U.S. Application Data

(63) Continuation of application No. 16/055,603, filed on Aug. 6, 2018, now Pat. No. 10,291,537, which is a continuation of application No. 15/630,523, filed on Jun. 22, 2017, now Pat. No. 10,063,486, which is a continuation of application No. 15/099,254, filed on Apr. 14, 2016, now Pat. No. 9,716,663, which is a continuation of application No. 14/474,329, filed on Sep. 2, 2014, now Pat. No. 9,325,600, which is a continuation of application No. PCT/US2014/042006, filed on Jun. 11, 2014.

(Continued)

(51) Int. Cl.
*G06F 15/173* (2006.01)
*G06F 15/16* (2006.01)

(Continued)

(52) U.S. Cl.
CPC ...... *H04L 47/2475* (2013.01); *H04L 43/0882* (2013.01); *H04L 43/10* (2013.01);
(Continued)

(58) Field of Classification Search
CPC ............... H04L 47/2475; H04L 43/0882; H04L 43/10; H04L 67/02; H04L 67/10;
(Continued)

(56) References Cited

U.S. PATENT DOCUMENTS 5,005,575 A 4/1991 Geri
5,461,627 A 10/1995 Rypinski
(Continued)

FOREIGN PATENT DOCUMENTS

| EP | 1613107 A2 | 1/2006 |
|---|---|---|
| WO | 2009070415 A1 | 6/2009 |
| WO | WO2010073263 A2 | 7/2010 |

OTHER PUBLICATIONS

EPO, Notice of Opposition in European Patent Application No. 14810579.4 dated May 16, 2019, 13 pages.
(Continued)

*Primary Examiner* — Melvin H Pollack
(74) *Attorney, Agent, or Firm* — NK Patent Law

(57) ABSTRACT

A mobile device is configured for communicating over a shared channel and an application specific channel. The application specific channel is a channel for an application on the mobile device to communicate with an application server. The mobile device is further configured for blocking the application specific channel to offload traffic therefrom to the shared channel. The blocking occurs in response to a screen of the mobile device being off and the blocking includes blocking the application from accessing the application server over the application specific channel.

17 Claims, 7 Drawing Sheets

Related U.S. Application Data

(60) Provisional application No. 61/833,844, filed on Jun. 11, 2013.

(51) Int. Cl.
    *H04L 12/859* (2013.01)
    *H04W 80/12* (2009.01)
    *H04L 29/08* (2006.01)
    *H04L 12/26* (2006.01)
    *H04W 28/02* (2009.01)
    *H04W 4/20* (2018.01)

(52) U.S. Cl.
    CPC ............. *H04L 67/02* (2013.01); *H04L 67/10* (2013.01); *H04L 67/26* (2013.01); *H04L 67/2857* (2013.01); *H04L 67/2876* (2013.01); *H04W 4/20* (2013.01); *H04W 28/0221* (2013.01); *H04W 80/12* (2013.01); *H04L 67/22* (2013.01)

(58) Field of Classification Search
    CPC .......................... H04L 67/26; H04L 67/2857; H04L 67/2876; H04L 67/22; H04W 4/20; H04W 28/0221; H04W 80/12
    USPC ........................................................ 709/225
    See application file for complete search history.

(56) References Cited

U.S. PATENT DOCUMENTS

| | | | |
|---|---|---|---|
| 5,463,307 A | 10/1995 | Rosenberg | |
| 5,799,209 A | 8/1998 | Chatter | |
| 5,894,580 A | 4/1999 | Yoshida | |
| 6,108,550 A | 8/2000 | Wiorek et al. | |
| 6,519,461 B1 | 2/2003 | Andersson et al. | |
| 6,529,723 B1 | 3/2003 | Bentley | |
| 7,152,111 B2 | 12/2006 | Allred et al. | |
| 7,155,483 B1 | 12/2006 | Friend et al. | |
| 7,209,459 B2 | 4/2007 | Kangas | |
| 7,480,907 B1 | 1/2009 | Marolia et al. | |
| 7,840,907 B2 | 11/2010 | Kikuchi et al. | |
| 8,015,249 B2 | 9/2011 | Nayak et al. | |
| 8,135,392 B2 | 3/2012 | Marcellino et al. | |
| 8,158,165 B2 | 4/2012 | Horak et al. | |
| 8,185,165 B2 | 5/2012 | Beninghaus et al. | |
| 8,359,290 B1 | 1/2013 | Muthusrinivasan | |
| 8,478,841 B2* | 7/2013 | Spitzer | G06Q 20/1235 709/203 |
| 8,503,340 B1 | 8/2013 | Xu | |
| 8,619,116 B2* | 12/2013 | Pennington | H04N 7/148 348/14.03 |
| 8,782,706 B2* | 7/2014 | Ellis | H04N 5/445 725/47 |
| 8,811,363 B2* | 8/2014 | Velasco | H04L 12/1403 370/338 |
| 8,811,952 B2 | 8/2014 | Fiatal et al. | |
| 8,832,764 B2* | 9/2014 | Clark | H04N 17/004 709/221 |
| 8,880,467 B1 | 11/2014 | Muthusrinivasan | |
| 8,886,176 B2 | 11/2014 | Luna et al. | |
| 8,904,206 B2 | 12/2014 | Black et al. | |
| 8,943,204 B2 | 1/2015 | Caldeira de Andrada et al. | |
| 9,113,483 B2* | 8/2015 | Zou | H04W 16/14 |
| 9,237,453 B2* | 1/2016 | Steer | H04W 76/36 |
| 9,247,019 B2 | 1/2016 | Luna et al. | |
| 9,320,043 B2* | 4/2016 | Lee | H04W 72/082 |
| 9,351,282 B2* | 5/2016 | Freda | H04W 72/02 |
| 9,369,539 B2 | 6/2016 | Luna et al. | |
| 9,432,433 B2* | 8/2016 | Luby | H04L 65/4084 |
| 9,485,749 B2* | 11/2016 | Narasimha | H04W 68/02 |
| 9,503,683 B2* | 11/2016 | Dunn | H04L 12/1827 |
| 9,516,129 B2 | 12/2016 | Luna et al. | |
| 9,553,816 B2 | 1/2017 | Luna et al. | |
| 9,603,056 B2 | 3/2017 | Luna et al. | |
| 9,647,918 B2* | 5/2017 | Raleigh | H04L 43/0876 |
| 9,686,731 B2* | 6/2017 | Jung | H04W 36/14 |
| 9,713,069 B2* | 7/2017 | Jung | H04W 48/08 |
| 9,755,880 B2* | 9/2017 | Cheng | H04L 27/2659 |
| 9,775,158 B2* | 9/2017 | Kalmbach | H04L 67/2842 |
| 9,838,905 B2 | 12/2017 | Luna et al. | |
| 9,955,403 B2* | 4/2018 | Jung | H04W 40/02 |
| 9,961,692 B2* | 5/2018 | Nordstrom | H04W 72/082 |
| 9,973,967 B2* | 5/2018 | Ratasuk | H04W 16/14 |
| 10,039,029 B2 | 7/2018 | Luna et al. | |
| 10,091,734 B2 | 10/2018 | Luna et al. | |
| 10,123,087 B1* | 11/2018 | Killick | H04N 21/482 |
| 10,250,678 B2* | 4/2019 | Mallik | H04W 8/005 |
| 2002/0156921 A1 | 10/2002 | Dutta et al. | |
| 2003/0101338 A1 | 5/2003 | Mullen et al. | |
| 2003/0125033 A1 | 7/2003 | Rindsberg et al. | |
| 2005/0108075 A1 | 5/2005 | Douglis et al. | |
| 2006/0087993 A1 | 4/2006 | Sengupta et al. | |
| 2006/0200849 A1 | 9/2006 | Sundarrajan et al. | |
| 2006/0223593 A1 | 10/2006 | Ishak | |
| 2007/0105548 A1 | 5/2007 | Mohan et al. | |
| 2007/0135080 A1 | 6/2007 | Islam et al. | |
| 2007/0195074 A1 | 8/2007 | Gelissen | |
| 2007/0238440 A1 | 10/2007 | Sengupta et al. | |
| 2008/0098476 A1 | 4/2008 | Syversen | |
| 2008/0198813 A1 | 8/2008 | Lu | |
| 2009/0061925 A1 | 3/2009 | Finkelstein et al. | |
| 2009/0122736 A1 | 5/2009 | Damnjanovic et al. | |
| 2009/0217065 A1 | 8/2009 | Araujo, Jr. | |
| 2009/0228566 A1 | 9/2009 | Sharp et al. | |
| 2009/0239574 A1 | 9/2009 | Hussain | |
| 2009/0305732 A1 | 12/2009 | Marcellino et al. | |
| 2009/0307696 A1 | 12/2009 | Vals et al. | |
| 2009/0325512 A1 | 12/2009 | Granlund et al. | |
| 2010/0077035 A1 | 3/2010 | Li et al. | |
| 2010/0088387 A1 | 4/2010 | Calamera | |
| 2010/0216434 A1 | 8/2010 | Marcellino et al. | |
| 2010/0322124 A1 | 12/2010 | Luoma et al. | |
| 2011/0060793 A1 | 3/2011 | Wheeler et al. | |
| 2011/0080422 A1 | 4/2011 | Lee et al. | |
| 2011/0122783 A1 | 5/2011 | Lin et al. | |
| 2011/0131321 A1 | 6/2011 | Black et al. | |
| 2011/0138015 A1 | 6/2011 | Adriazola | |
| 2011/0153728 A1 | 6/2011 | Einarsson et al. | |
| 2011/0177847 A1 | 7/2011 | Huang | |
| 2011/0182220 A1 | 7/2011 | Black et al. | |
| 2011/0185202 A1 | 7/2011 | Black et al. | |
| 2011/0249668 A1 | 10/2011 | Van Milligan et al. | |
| 2012/0173610 A1 | 7/2012 | Bleau et al. | |
| 2012/0173901 A1 | 7/2012 | Soliman et al. | |
| 2012/0233031 A1 | 9/2012 | Chang et al. | |
| 2012/0260118 A1 | 10/2012 | Jiang et al. | |
| 2012/0270538 A1 | 10/2012 | Meylan et al. | |
| 2012/0278475 A1 | 11/2012 | Papakipos et al. | |
| 2012/0303774 A1 | 11/2012 | Wilson et al. | |
| 2013/0191544 A1 | 7/2013 | Caldeira de Andrada et al. | |
| 2014/0036697 A1 | 2/2014 | Annan, et al. | |
| 2014/0068692 A1* | 3/2014 | Archibong | G06Q 30/0277 725/116 |
| 2014/0074941 A1 | 3/2014 | He | |
| 2014/0184422 A1 | 7/2014 | Mensinger et al. | |
| 2014/0366042 A1 | 12/2014 | Chan et al. | |
| 2016/0323775 A1 | 11/2016 | Luna et al. | |
| 2018/0115625 A1* | 4/2018 | Livneh | G06F 21/6254 |
| 2019/0261203 A1* | 8/2019 | Raleigh | H04W 48/02 |

OTHER PUBLICATIONS

Karl D. Easthom; *Google LLC*, Petitioner, v. *Seven Networks, LLC*, Patent Owner; Case IPR2018-01118; U.S. Appl. No. 9,325,600; Judgment 37 C.F.R. § 42.73(b); Jan. 11, 2019; pp. 1-8.

*Samsung Electronics Co., LTD. and Samsung Electronics America, Inc.*, Petitioner, v. *Seven Networks, LLC*, Patent Owner; Case No. IPR2018-01122; U.S. Appl. No. 9,325,600; Joint Motion to Terminate Pursuant to 35 U.S.C. § 317; Jan. 8, 2019; pp. 1-14.

(56) References Cited

OTHER PUBLICATIONS

Karl D. Easthom; Decision—Motion to Dismiss 37 C.F.R. § 42.71(a); *Samsung Electronics Co., LTD. and Samsung Electronics America, Inc*, Petitioner, v. *Seven Networks, LLC*, Patent Owner; Case IPR2018-01120 (U.S. Appl. No. 9,247,019 B2), Case IPR2018-01122 (U.S. Appl. No. 9,325,600 B2), Case IPR2018-01127 (U.S. Appl. No. 3,553,816 B2); Jan. 11, 2019; pp. 1-3.
*Google LLC*, Petitioner, v. *Seven Networks, LLC*, Patent Owner; Case IPR2018-01118, U.S. Appl. No. 9,325,600; Patent Owner Seven Networks, LLC's Preliminary Response to Petition for Inter Partes Review of U.S. Appl. No. 9,325,600 Pursuant to 35 U.S.C. § 313, 37 C.F.R. §42.107; Oct. 18, 2018; pp. 1-84.
Samsung as Petitioner, IPR 2018-01122 filed on May 21, 2018, and associated documents of entire petition history.
Google as Petitioner, IPR 2018-01118 filed on May 18, 2018, and associated documents of entire petition history.
Transmission Control Protocol, RFC 793 (John Postel ed., Sep. 1981).
M. Crispin, Internet Message Access Protocol—Version 4rev1, RFC 3501 (Mar. 2003).
Bluetooth Specification Version 4.0 (Jun. 2010).
Bluetooth History, available at https://www.bluetooth.com/about-us/our-history.
Excerpt from Paperback Oxford English Dictionary, Seventh Edition (2012), p. 69.
Excerpt from The American Heritage Dictionary (2012), p. 93.
Excerpt from Webster's New World College Dictionary, Fifth Edition (2014), p. 158.
Butler, Christopher, Affidavit dated May 14, 2018, and associated documents.
3GPP TS 22.090 Technical Specification, v9.0.0 (Dec. 2009).
"RFC 793—Transmission Control Protocol," Information Sciences Institute (Sep. 1981).
Comer, D., Internetworking with TCP/IP vol. 1, 2nd ed., Prentice-Hall (1991).
Seven Networks, LLC's Opening Claim-Construction Brief. Civil Action No. 3:17-cv-01495-M *Seven Networks, LLC*, Plaintiff, v. *ZTE (USA) Inc. and ZTE Corporation*, Defendants. (Feb. 20, 2018).
Seven Networks, LLC's Appendix in Support of Its Opening Claim-Construction Brief. Civil Action No. 3:17-cv-01495-M *Seven Networks, LLC*, Plaintiff, v. *ZTE (USA) Inc. and ZTE Corporation*, Defendants. (Feb. 20, 2018).
Defendant ZTE (USA), Inc.'s Opening Claim Construction Brief. Civil Action No. 3:17-cv-01495-M *Seven Networks, LLC*, Plaintiff, v. *ZTE (USA) Inc. and ZTE Corporation*, Defendants. (Feb. 21, 2018).
ZTE (USA), Inc.'s Appendix in Support of Its Opening Claim Construction Brief. Civil Action No. 3:17-cv-01495-M *Seven Networks, LLC*, Plaintiff, v. *ZTE (USA) Inc. and ZTE Corporation*, Defendants. (Feb. 21, 2018).
Defendant ZTE (USA), Inc.'s Responsive Claim Construction Brief. Civil Action No. 3:17-cv-01495-M *Seven Networks, LLC*, Plaintiff, v. *ZTE (USA) Inc. and ZTE Corporation*, Defendants. (Mar. 6, 2018).
Appendix in Support of Defendant ZTE (USA), Inc.'s Responsive Claim Construction Brief. Civil Action No. 3:17-cv-01495-M *Seven Networks, LLC*, Plaintiff, v. *ZTE (USA) Inc. and ZTE Corporation*, Defendants. (Mar. 6, 2018).
Seven Networks, LLC's Responsive Claim-Construction Brief. Civil Action No. 3:17-cv-01495-M *Seven Networks, LLC*, Plaintiff, v. *ZTE (USA) Inc. and ZTE Corporation*, Defendants. (Mar. 6, 2018).
Seven Networks, LLC's Appendix in Support of Its Responsive Claim-Construction Brief. Civil Action No. 3:17-cv-01495-M *Seven Networks, LLC*, Plaintiff, v. *ZTE (USA) Inc. and ZTE Corporation*, Defendants. (Mar. 6, 2018).
Nov. 15, 2017 *Seven v. Google & Samsung* Invalidity Cover Pleading EDTX: Civil Action No. 2:17-cv-00442-JRG; Civil Action No. 2:17-cv-00441s-JRG.

Exhibit 600-B to Invalidity Contentions Civil Action No. 2:17-cv-00442-JRG; Civil Action No. 2:17-cv-00441s-JRG.
Exhibit C to Civil Action No. 2:17-cv-00442-JRG; Civil Action No. 2:17-cv-00441s-JRG.
Exhibit 600-A1 Invalidity of U.S. Pat. No. 9,325,600 in View of U.S. Patent Publication No. 2007/0135080.
Exhibit 600-A2 Invalidity of U.S. Pat. No. 9,325,600 in View of U.S. Patent Publication No. 2012/0173901.
Alan Henry, "The Best Data Usage Tracker for Android," Lifehacker.com (Jun. 8, 2012), available at https://lifehacker.com/5916784/the-best-data-usage-tracker-for-android.
Exhibit 600-A4 Invalidity of U.S. Pat. No. 9,325,600 in View of U.S. Patent Publication No. US2010/0088387.
Exhibit 600-A5 Invalidity of U.S. Pat. No. 9,325,600 in View of GoS 360° System.
Exhibit 600-A6 Invalidity of U.S. Pat. No. 9,325,600 in View of U.S. Pat. No. 8,943,204.
Exhibit 600-A7 Invalidity of U.S. Pat. No. 9,325,600 in View of U.S. App. Pub. No. 2011/0182220 A1.
Exhibit 600-A8 Invalidity of U.S. Pat. No. 9,325,600 in View of U.S. App. Pub. No. 2011/0185202 A1.
Exhibit 600-A9 Invalidity of U.S. Pat. No. 9,325,600 in View of U.S. App. Pub. No. 2011/0131321 A1.
Exhibit 600-A10 Invalidity of U.S. Pat. No. 9,325,600 in View of Greenify (Donation Package) Application with GCM Push.
Exhibit 600-A11 Invalidity of U.S. Pat. No. 9,325,600 in View of U.S. Patent Application No. 2012/0270538 A1.
Obser, Sven, "User-controlled Internet Connections in Android", Diss. Saarland University, Dec. 22, 2011.
CRêPE: A System for Enforcing Fine-Grained Context-Related Policies on Android (Feb. 11, 2015).
"TIS Firewall Toolkit," Trusted Information Systems, Inc. (Jun. 30, 1994), available at http://www.fwtk.org/fwtk/docs/overview.pdf.
GoS 360° website (May 7, 2012), available at http://web.archive.org/web/20120507212809/ http://www.gosnetworks.com:80/.
GoS Networks, "A guide to cost-effective next generation services", available at http://web.archive.org/web/20120118090200/http://www.gosnetworks.com/images/documentation/gos-booklet.pdf (Jan. 18, 2012).
"How to Deliver Outstanding Customer Service Support", available at http://blog.gosnetworks.com/how-to-deliver-outstanding-customer-service-support/ (Jun. 27, 2012).
GoS 360° Use Case: "Chatty Applications", available at http://www.gosnetworks.com/documents/usecase-chatty-apps.pdf.
GoS 360° Use Case: "Battery Savings", available at http://www.gosnetworks.com/documents/usecase-battery-saving.pdf (Feb. 2013).
GoS 360° —"Enabling End-to-End Policy Control Architecture", available at http://www.gosnetworks.com/products/end-to-end-policy-control-architecture.
GoS 360° Datasheet, available at http://www.gosnetworks.com/documents/gos-datasheet.pdf (Jun. 2013), earlier versions available at http://web.archive.org/web/20120207185040/http://www.gosnetworks.com/images/documentation/GoSFWDS-030611-V1.pdf (Jun. 2013).
XDA Community Apps, Greenify, "[APP][4.1+]Greenify v2.9 Final (Updated on Aug. 1)" available at https://forum.xdadevelopers.com/showthread.php?t=2155737 (Feb. 19, 2013).
App Report for Greenify (Donation Package), available at https://www.mobileaction.co/app/android/us/greenify-donationpackage/com.oasisfeng.greenify.pro (Dec. 31, 2013).
FAQ for Greenify users, available at https://plus.google.com/112105199234363320140/posts/Gz4TB2fAUV5 (Feb. 18, 2013).
"How to Reclaim your Android Device's Battery Life with Greenify! (Install, Setup, and Tutorial)," available at https://www.youtube.com/watch?v=5J3CCpxJBuE&feature=youtu.be (Jan. 30, 2014).
Proceedings of National Conference on Recent Developments in Computing and Its Applications, Aug. 12-13, 2009. I.K. International Pvt. Ltd.

(56) References Cited

OTHER PUBLICATIONS

Gilstrap Rodney; The US District Court for the Eastern District of TX, Marshall Division; Case No. 2:19-CV-URG; *Seven Networks, LCC* v. *Apple Inc.*; Claim Construction Memorandum and Order; Filed Mar. 31,2 020; pp. 1-102.

* cited by examiner

BLOCKING APPLICATION TRAFFIC FOR RESOURCE CONSERVATION IN A MOBILE DEVICE

CROSS-REFERENCE TO RELATED APPLICATIONS

This application is a continuation of U.S. patent application Ser. No. 16/055,603 filed on Aug. 6, 2018 and entitled "METHODS FOR REDUCING TRAFFIC FOR A MOBILE DEVICE COMMUNICATING OVER MULTIPLE CHANNELS", issuing as U.S. Pat. No. 10,291,537 on May 14, 2019, which is a continuation of U.S. patent application Ser. No. 15/630,523 filed on Jun. 22, 2017 and entitled "OFFLOADING APPLICATION TRAFFIC TO A SHARED COMMUNICATION CHANNEL FOR SIGNAL OPTIMIZATION IN A WIRELESS NETWORK FOR TRAFFIC UTILIZING PROPRIETARY AND NON-PROPRIETARY PROTOCOLS", now U.S. Pat. No. 10,063,486, which is a continuation of U.S. patent application Ser. No. 15/099,254 filed on Apr. 14, 2016 and entitled "OFFLOADING APPLICATION TRAFFIC TO A SHARED COMMUNICATION CHANNEL FOR SIGNAL OPTIMIZATION IN A WIRELESS NETWORK FOR TRAFFIC UTILIZING PROPRIETARY AND NON-PROPRIETARY PROTOCOLS", now U.S. Pat. No. 9,716,663, which is a continuation of U.S. patent application Ser. No. 14/474,329 filed on Sep. 2, 2014 and entitled "OFFLOADING APPLICATION TRAFFIC TO A SHARED COMMUNICATION CHANNEL FOR SIGNAL OPTIMIZATION IN A WIRELESS NETWORK FOR TRAFFIC UTILIZING PROPRIETARY AND NON-PROPRIETARY PROTOCOLS", now U.S. Pat. No. 9,325,600, which is a continuation of PCT Patent Application No. PCT/US14/42006 filed on Jun. 11, 2014 and entitled "OFFLOADING APPLICATION TRAFFIC TO A SHARED COMMUNICATION CHANNEL FOR SIGNAL OPTIMIZATION IN A WIRELESS NETWORK FOR TRAFFIC UTILIZING PROPRIETARY AND NON-PROPRIETARY PROTOCOLS", which claims priority to U.S. Provisional Patent Application No. 61/833,844 filed on Jun. 11, 2013 and entitled "OFFLOADING APPLICATION TRAFFIC TO A SHARED COMMUNICATION CHANNEL FOR SIGNALING OPTIMIZATION IN A WIRELESS NETWORK FOR TRAFFIC UTILIZING PROPRIETARY AND NON-PROPRIETARY PROTOCOLS", the entire contents of which are incorporated by reference herein.

BACKGROUND

An increasing amount of mobile traffic is moving to vendor-specific proprietary protocols. Examples include Google' s traffic over TCP port 5228, WhatsApp, Urban Airship push notifications used by various application vendors, Skype, Yahoo Mail 2.0 etc. This means that more and more of the application traffic that causes signaling now includes significant contribution from proprietary protocols on top of traffic utilizing standardized protocols such as HTTP/HTTPS. The disclosed technology includes an architecture (e.g., the distributed system comprised of the local proxy and/or the proxy server) to optimize signaling for arbitrary, proprietary, and/or non-standard protocols, in addition to standard protocols such as HTTP or HTTPS by offloading application traffic from a proprietary or application specific communication channel to a shared communication channel.

SUMMARY

One or more methods are disclosed herein. The one or more methods may include determining that a device is communicating over at least two overlapping push channels and blocking one of the push channels to eliminate or reduce overlap between the at least two overlapping push channels. Blocking may include dropping IP packets received from the blocked push channel. Blocking may include rejecting an IP packet received from the blocked push channel. Blocking may include blocking on an application layer for communications received from the blocked push channel. The one or more methods may include determining the state of any existing connections that an application on the device is communicating on. The one or more methods may include, in response to determining the state of an existing connection, closing the application connection. The one or more methods may include receiving a push message from an additional push channel and unblocking the blocked push channel so that the application can perform an action in response to the message from the additional push channel. The one or more methods may include notifying the user of the action. The one or more methods may include re-blocking the unblocked push channel after the action has completed. The one or more methods may include determining that the action is complete and re-blocking the unblocked push channel after the action has completed. The one or more methods may include denying blocking of the push channel until a radio of the mobile device is powered on. The push channels may be proprietary or application specific. Blocking one of the push channels may include blocking a non-common push channel to offload the communication onto a common push channel.

A method of reducing network traffic is provided. The method may include recognizing multiple overlapping push channels at an application, determining that a first push channel of said multiple overlapping push channels can be blocked with minimal user experience impact, blocking the first push channel to reduce network signaling and battery consumption, monitoring application traffic over a second push channel of said multiple overlapping push channels, unblocking the first push channel based on monitored application traffic to service application traffic, and re-blocking the first push channel after the application has serviced application traffic. Recognizing multiple overlapping push channels may be performed offline. Recognizing multiple overlapping push channels may be performed in real time. In one or more embodiments, the first channel may be that of a third party. Blocking may be performed by one of the following: dropping IP packets, rejecting IP packets, and blocking an application layer. Servicing application traffic may include notifying a user.

Provided herein is non-transitory computer readable media containing computer code to implement a processor controlled system for determining that a device is communicating over at least two overlapping push channels and blocking one of the push channels to reduce overlap between the at least two overlapping push channels. The computer code implements a processor controlled system that blocks by dropping IP packets. The computer code implements a processor controlled system that blocks by rejecting IP packets. The computer code implements a processor controlled system that blocks an application layer. The computer code implements a processor controlled system that determines the state of any existing connections that the system is communicating on. The computer code implements a processor controlled system that closes an application connection. The computer code implements a processor controlled system that receives a push message from an additional push channel and unblocks the blocked push channel so that the system can perform an action in response to the message from the additional push channel. The computer code may implement a processor controlled system that notifies the user of the action. The computer code implements a processor controlled system that re-blocks the unblocked push channel after the action has completed. The computer code implements a processor controlled system that determines that the action is complete and re-blocks the unblocked push channel after the action has completed. Non-transitory computer readable media containing computer code to implement a processor controlled system for reducing network traffic is provided and configured for recognizing multiple overlapping push channels at an application, determining that a first push channel of said multiple overlapping push channels can be blocked with minimal user experience impact, blocking the first push channel such that network signaling and battery consumption are reduced, monitoring application traffic over a second push channel of said multiple overlapping push channels, unblocking the first push channel based on application traffic over the second push channel to enable servicing application traffic, and re-blocking the first push channel after the application has performed necessary network access to service the application traffic. Recognizing multiple overlapping push channels may be performed offline. Recognizing multiple overlapping push channels may be performed in real time. At least one of said multiple overlapping push channels may be that of a third party. Blocking may be performed by one of the following: dropping IP packets, rejecting IP packets, and blocking input to an application layer.

A communication network may be provided. The network may include a mobile device having a processor, memory for storing information, and a user interface, the mobile device operating in accord with an operating system and in accord with a push client application. Also provided is a first server, a second server, a host server, a first network operatively connecting said first server and said second server to said host server, and a second network operatively connecting said first network to said mobile device. The push client application controls the processor to cause the mobile device to determine that the first server and the second server produce overlapping first and second push channels and block the first push channel to reduce overlap between the first and second push channels. The mobile device may block the first push channel by dropping IP packets, rejecting IP packets, or blocking an application layer. The processor may further include determining the state of any existing connections that an application on the device is communicating on.

A communication network is provided. The network includes a mobile device having a processor, memory storing an operating system and a push client application, and a user interface. The mobile device operates in accord with the operating system and in accord with the push client application. A first server having a first push channel and a second server having a second push channel that overlaps the first push channel are provided. A host server is provided. A first network operatively connects said first server and the second server to said host server and a second network operatively connects the first network to said mobile device. The push client application controls the processor to determine that the first and second push channels overlap, determine that the first push channel can be blocked with minimal user experience impact, block the first push channel to reduce network signaling and battery consumption, monitor traffic on the second push channel, unblock the first push channel based on traffic on the second push channel, and re-block the first push channel after the push client application has performed necessary network access to service application traffic.

DETAILED DESCRIPTION

Figure 1A:
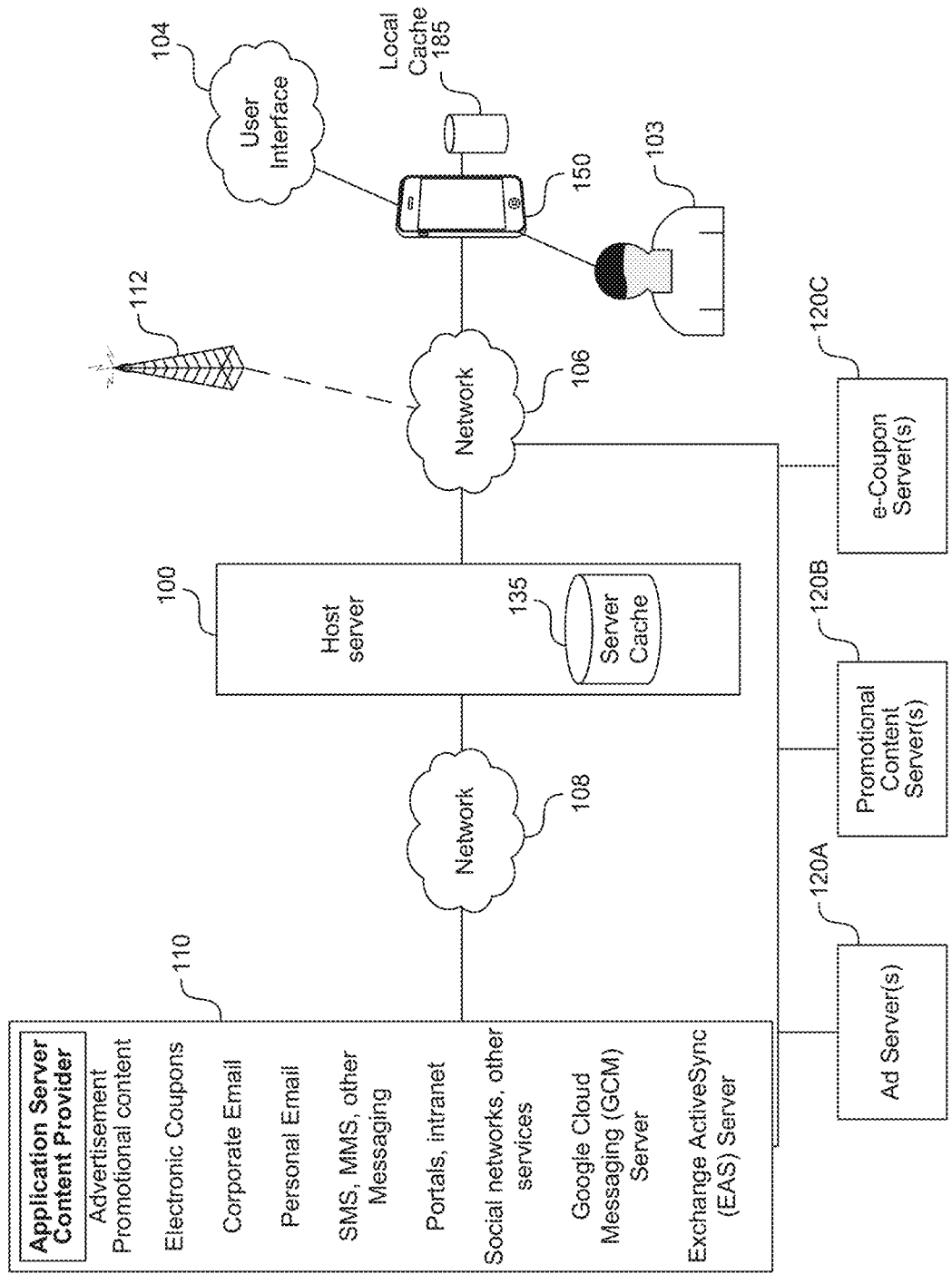
FIG. 1A illustrates a system according to one or more embodiments disclosed herein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Existing signaling optimization systems and methods for reducing mobile network congestion can optimize mobile traffic over standard and non-proprietary application level protocols including, but not limited to: Hypertext Transfer Protocol (HTTP), Hypertext Transfer Protocol Secure (HTTPS), File Transfer Protocol (FTP), Simple Mail Transfer Protocol (SMTP), Internet Message Access Protocol (IMAP), Post Office Protocol (POP), and the like. However, many mobile applications are moving away from the standard protocols towards vendor specific proprietary protocols. For example, Google utilizes a non-standard Transmission Control Protocol (TCP) port 5228. By way of another example, the "WhatsApp" mobile application uses a customized version of the Extensible Messaging and Presence Protocol (XMPP). Similarly, some applications such as Skype and Yahoo mail use their own proprietary protocols, while others such as Urban Airship's push notifications protocol is used by various vendors.

Existing signaling optimization systems and methods replay or replicate entire transaction as instructed by a client, which means that the server performing the signal optimization needs to establish any session (TCP socket and any application level handshakes, Secure Sockets Layer (SSL), etc.) autonomously. However, to do so, the protocols must be well understood. For example, the header and other protocol specific data must be known before any optimization can be performed. As proprietary protocols are not standardized and not well understood, mobile traffic over such proprietary protocols cannot be optimized by existing optimization systems and methods.

Embodiments of the present disclosure includes offloading application traffic to a shared communication channel for signaling optimization in a wireless network for traffic utilizing both proprietary and non-proprietary protocols. The disclosed technology includes an architecture (e.g., a distributed system comprised of a local proxy and/or a proxy server) that optimizes signaling for arbitrary, proprietary, and/or non-standard protocols, in addition to standard protocols such as HTTP, HTTPS, FTP, SMTP, IMAP, POP, XMPP, and the like in one embodiment. In a further embodiment, the disclosed technology provides a protocol agnostic systems and methods for signaling optimization for any traffic in a wireless network.

In one embodiment, a Transmission Control Protocol (TCP) stream is passed as a byte stream from an application to a local proxy over a first session, from the local proxy to a proxy server over a second TCP session, and from the proxy server to a content server over a third TCP session. The local proxy observes and identifies patterns within the byte stream, without being aware of the underlying protocol. Once a pattern is identified, the second TCP session is torn down such that the first TCP session replays the pattern to the application, and third TCP session replays the pattern to the content server. Once either side detects a change in the pattern, the second TCP session is re-established to deliver the changed content to the other end.

When it is not possible to identify a pattern within a byte stream and perform a direct replay of the binary transactions, and/or in addition to the TCP stream optimization, the disclosed innovation herein provides systems and methods for offloading or redirecting application traffic from the application-specific channel to a shared channel such as the Google Cloud Messaging (GCM) channel, which can optimize signaling in the wireless network for traffic utilizing various proprietary and non-proprietary protocols. The application traffic offloading to a remote or messaging server such as the Google Cloud Messaging (GCM) server if facilitated by a local proxy and/or a proxy server. As used herein, GCM may refer to any shared channel.

The GCM server allows transfer of data from an application server or content provider to user devices using XMPP (upstream and downstream i.e., device to cloud and cloud to device). The GCM server can queue messages and deliver the messages to the target applications on the user device. These messages can inform the mobile application that there is new data to be fetched from the content provider or application server and/or can include actual data (e.g., instant messages).

FIG. 1A illustrates an example diagram of a system where a host server facilitates management of traffic, content caching, and/or resource conservation between mobile devices (e.g., wireless devices), an application server or content provider, or other servers such as an ad server, promotional content server, an e-coupon server or messaging servers such as the Google Cloud Messaging (GCM) server in a wireless network (or broadband network) for resource conservation. The host server can further optimize signaling in a wireless network for traffic utilizing proprietary (non-standard) and non-proprietary (e.g., HTTP) protocols.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or keepalive optimization/algorithms for signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

Functions and techniques disclosed for context aware traffic management and keepalive algorithms for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1B. Functions and techniques performed by the proxy and cache components in the client device 150 and the related components therein are described, respectively, in detail with further reference to the examples of FIG. 2A.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1B:
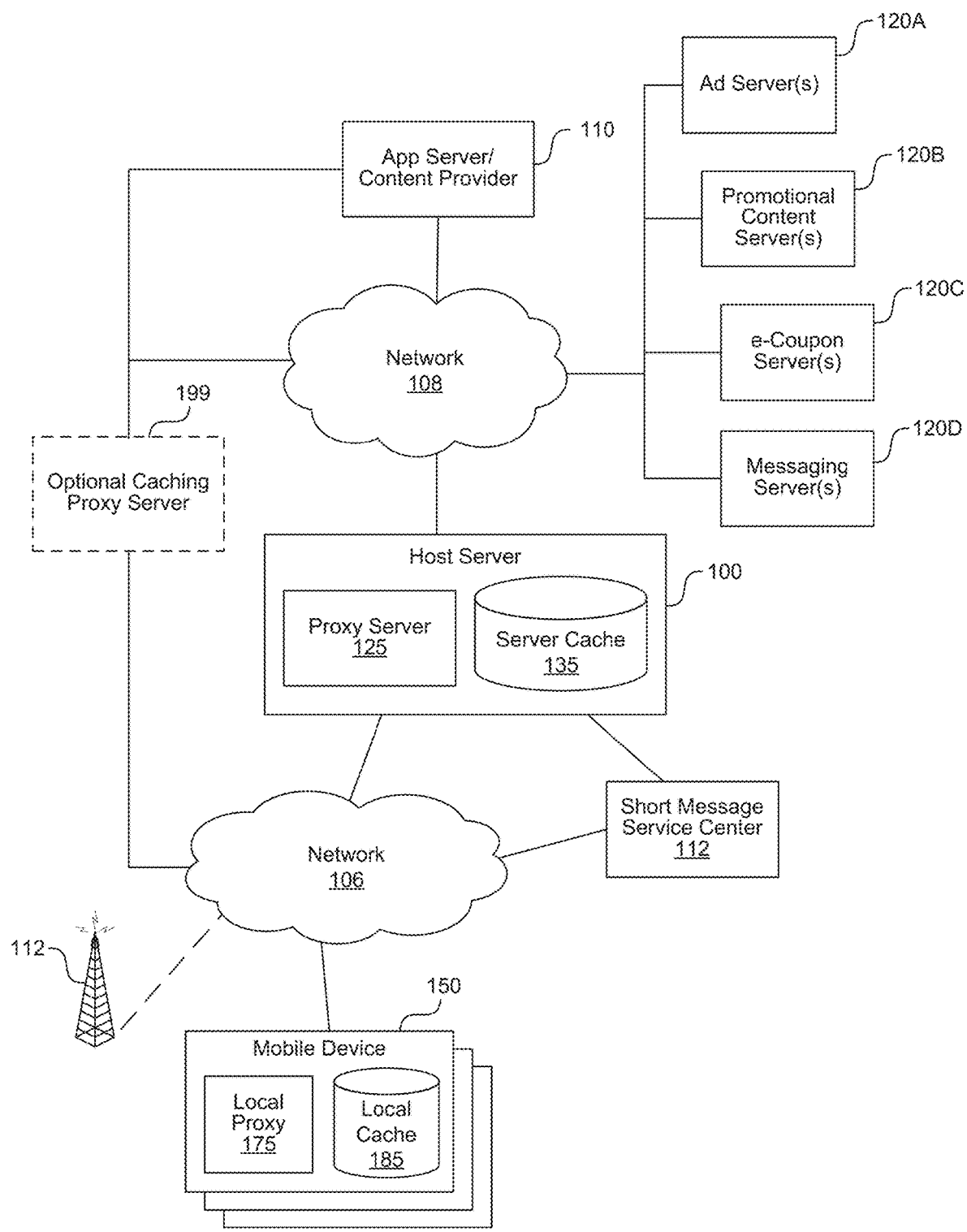
FIG. 1B illustrates an example diagram according to one or more embodiments disclosed herein.

FIG. 1B illustrates an example diagram of a proxy and cache system distributed between the host server and device which facilitates network traffic management between a device, an application server or content provider, or other servers such as an ad server, promotional content server, an e-coupon server or messaging servers such as the GCM server for resource conservation and content caching. The proxy system distributed among the host server and the device can further optimize signaling in a wireless network for traffic utilizing proprietary (non-standard) and non-proprietary (e.g., HTTP) protocols.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM servers) 120D as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or keepalive optimization in signaling optimization in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150. The local proxy 175 can be a protocol agnostic component that can identify a pattern within a byte stream and perform a direct replay of the binary transactions in one embodiment. In another embodiment, the local proxy 175 can optimize keepalives for signaling optimization in a wireless network utilizing proprietary and/or non-proprietary protocols.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2A.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority traffic) towards the network, the local proxy 175 can conserve battery resources of the mobile device.

Figure 1C:
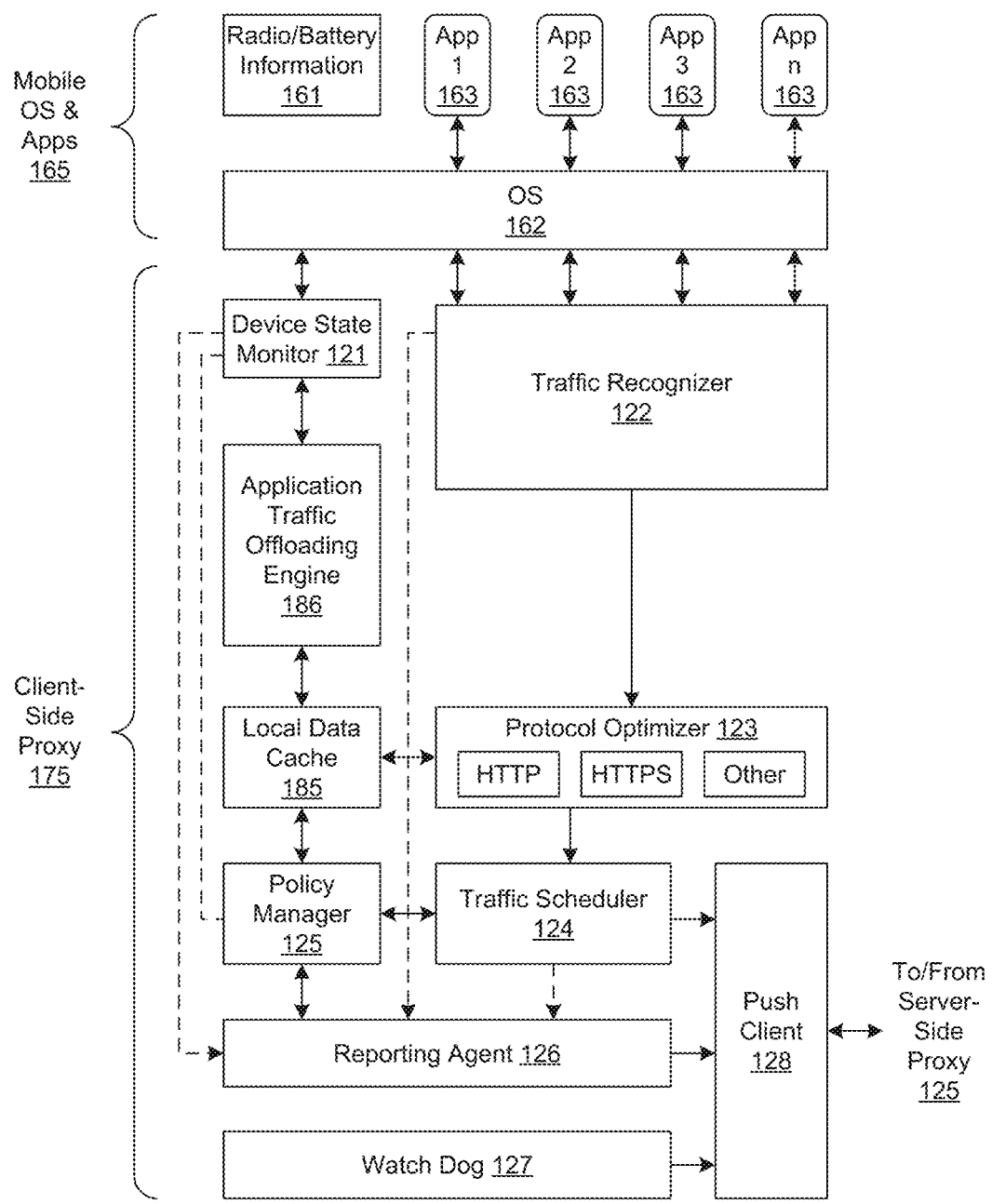
FIG. 1C illustrates an example diagram according to one or more embodiments disclosed herein.

FIG. 1C illustrates an example diagram showing the architecture of client side components in a distributed proxy and cache system having an application traffic offloading engine for optimizing signaling in a wireless network for traffic utilizing proprietary (non-standard) and non-proprietary (e.g., HTTP) protocols.

The client side proxy components 175 can include software components or agents installed on the mobile device that enables traffic optimization and performs the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a log storage and processing service 176, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 2A:
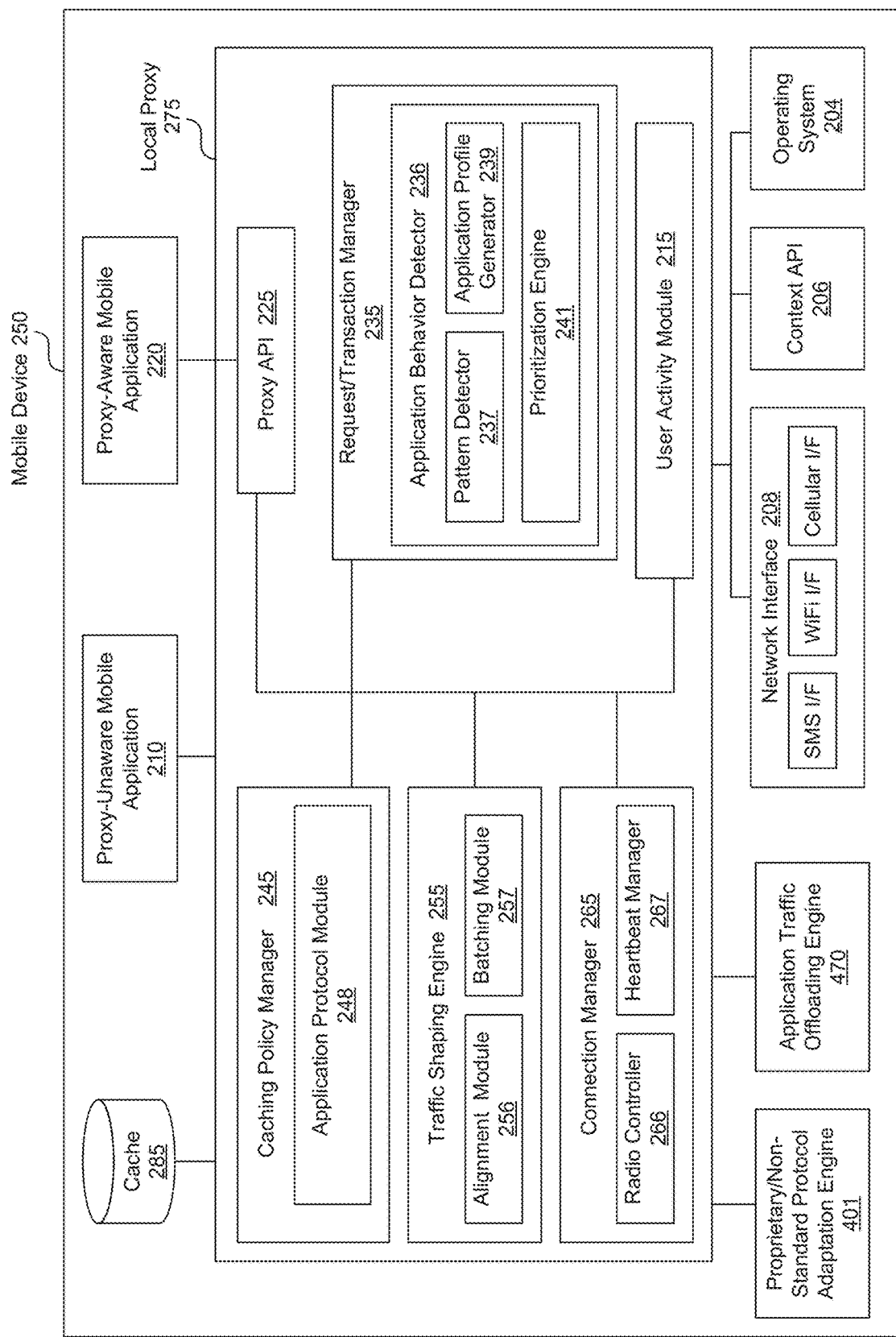
FIG. 2A illustrates a block diagram of client-side components according to one or more embodiments disclosed herein.
Figure 2B:
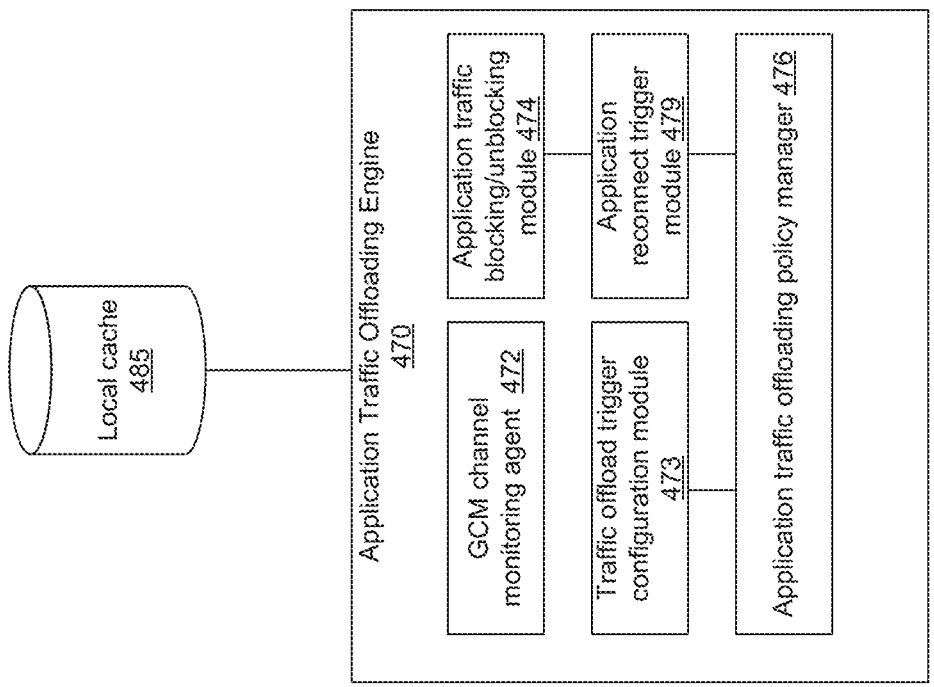
FIG. 2B illustrates a block diagram of an adaptation engine according to one or more embodiments disclosed herein.

The functions and features of the application traffic offloading engine 470 is described in detail in FIG. 2B.

FIG. 2A depicts a block diagram illustrating another example of client-side components in a distributed proxy and cache system, further including a proprietary/non-standard protocol adaptation engine and an application traffic offloading engine. The client-side components in a distributed proxy and cache system can reside on a mobile device (e.g., wireless device) 250 that manages traffic in a wireless network (or broadband network) for offloading application traffic for signaling optimization, resource conservation, content caching, and/or traffic management. The client-side proxy (or local proxy 275) can further categorize mobile traffic and/or implement delivery policies based on application behavior, content priority, user activity, and/or user expectations.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that the device 250 is specifically illustrated in the example of FIG. 2A as a mobile device, such is not a limitation and that device 250 may be any wireless, broadband, portable/mobile or non-portable device able to receive, transmit signals to satisfy data requests over a network including wired or wireless networks (e.g., Wi-Fi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.,), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. The local proxy or the device can further include a proprietary/non-standard protocol adaptation engine 401 for optimizing traffic in a protocol agnostic manner, and/or an application traffic offloading engine 470 for blocking application specific channels, and offloading traffic to a shared channel to optimize signaling in the wireless network for traffic in a protocol agnostic manner. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 and other mobile applications) to open TCP connections to a remote server (e.g., the server 100). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server) send the data that was buffered as a result of the previously decreased communication frequency.

In addition, or in alternative, the local proxy 275 can communicate the characteristics of user activity at the device 250 to the remote device (e.g., host server 100) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics. The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
| --- | --- | --- | --- |
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, a content provider/application server such as the server/provider 110 or the messaging server(s) such as the GCM and/or EAS servers). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy to determine whether a remotely stored response is valid. If so, the remotely stored response (e.g., which may be stored on the server cache 135 or optional caching server 199) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy which forwards the data request to a content source (e.g., application server/content provider 110) and a response from the content source can be provided through the remote proxy. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110) that would result from the application requests that would be performed at the mobile device or wireless device 250 to be performed instead, by a proxy server (e.g., proxy server 125) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 100.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

FIG. 2B depicts a block diagram illustrating additional components in the proprietary/non-standard protocol adaptation engine and the application traffic offloading engine shown in the example of FIG. 2.

Some applications have their own mechanisms for communicating with the application servers or other third-party servers. For example, these applications can use their own communication channels to periodically poll their application/third-party servers for updates. Some applications also use their proprietary push channels to receive push notifications. Many of these applications also utilize hybrid push channels. For example, some applications utilize the GCM as a communication channel to receive push notifications or other data and upload data in addition to their own proprietary communication channel. In one embodiment, signaling from applications having hybrid push or other communication channels can be optimized by offloading communication or traffic from the application-specific channel to a shared channel such as the GCM channel (e.g., via the application traffic offloading engine 470 from FIG. 2A-2B). The offloading, in one implementation, can be managed by a policy enforcer or manager (e.g., application traffic offloading policy manager 476 in FIG. 2B) that enforces traffic management policies at the mobile device's IP layer.

Figure 2C:
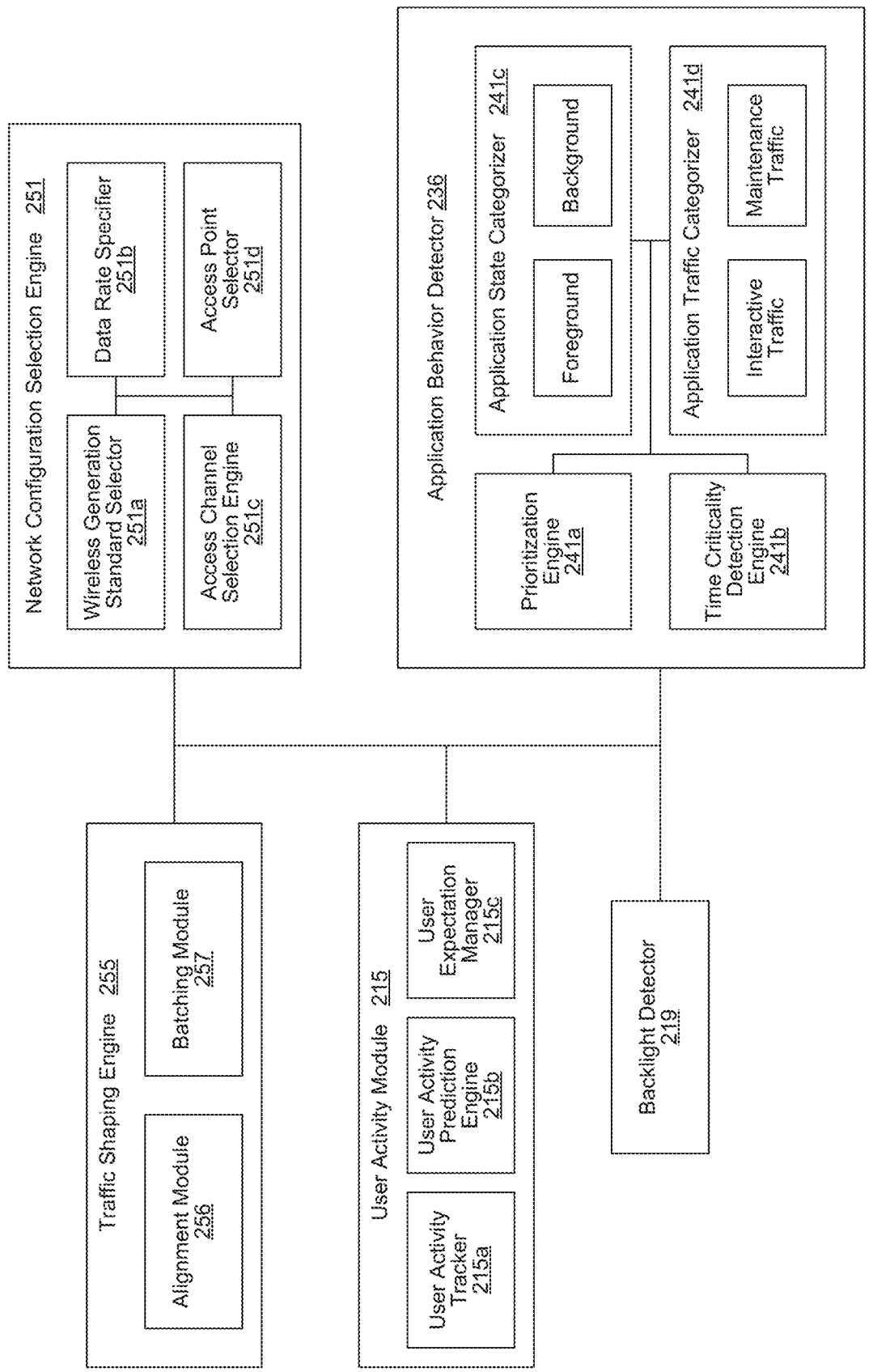
FIG. 2C illustrates a block diagram of a client side proxy according to one or more embodiments disclosed herein.

In one embodiment, certain policies for offloading traffic to a shared channel can be enforced based on contextual information such as the state of the mobile device (e.g., device user interface is being actively used, or is idle for a duration, screen is off, device is offline), state of the application (e.g., application is on the foreground or background), and the like (e.g., via application behavior detector 236, user activity module 215 and/or backlight detector 219 from FIG. 2C). For example, when the screen of the mobile device is off or when there is no user interaction, the policy enforcer can be triggered to enforce a policy that blocks an application so that the application cannot communicate with its application server or other third-party server to get updates, for example (e.g., via the application traffic blocking/unblocking module 474 in FIG. 2B). In one implementation, all traffic, including keepalive traffic, from and/or to the application can be blocked such that the application has no direct access to the network. Alternately, in another implementation, the application itself can be killed.

A local proxy on the mobile device can monitor the GCM channel for any messages from the GCM server (e.g., via the GCM channel monitoring agent 472). The GCM messages can be messages targeted to the blocked application or targeted to any application. When a message targeted to the blocked application is detected, the local proxy can trigger unblocking of the application to allow the application to communicate with its application server or third-party server (e.g., via the application traffic blocking/unblocking module 474 in FIG. 2B). In one implementation, in addition to a GCM message trigger, other changes in contextual state of the device (e.g., application moving to the foreground, user interaction, etc.) can also act as a trigger for unblocking an application (e.g., based on configuration of the traffic offload trigger configuration module 473 in FIG. 2B). On unblocking, the application can access the network, and upload/download data to/from the application server or third-party server. In one implementation, in the Android® based systems, a connectivity Intent can be broadcast or sent to the application to trigger the application to connect to the network, and sync with the application server or third-party server.

In one implementation, the policy enforcer can define or configure the local proxy to unblock the application for a period of time. After that period of time expires, the local proxy can again block or kill the application, and continue monitoring the GCM channel to detect and/or intercept GCM messages directed to the blocked application.

In one embodiment, in addition to offloading communication to the GCM channel and using GCM message as a trigger to unblock a blocked application, the local proxy can further consolidate keepalives or other traffic from their proprietary channels to the shared push channel such as the GCM channel to optimize signaling and/or other device resources.

One or more methods provided herein include recognizing (either through offline analysis on in real time in the device) that a given application utilizes multiple overlapping push channels (typically its own and a third-party) and finding a mechanism that will direct the application to shift from one mechanism to another (which is more network/battery friendly) without impact on user experience, and having the desired network/battery savings impact, through identifying The method may further include, at which point of application's internal state machine the non-wanted mechanism is to be blocked so that both network signaling reduction and battery consumption (if blocked incorrectly, the application may start spinning consuming more CPU/battery even if not being able to consume network signaling) reduction can be achieved—typical mechanisms include dropping IP packets (not responding to them), rejecting IP packets (responding with ICMP Destination Unreachable messages), or blocking on application layer (accepting the TCP/IP socket and first payload data, but not responding on application layer), and taking into account the state of any existing connections that the application has (which typically need to be actively closed so that the server side does not attempt to send push messages through the blocked channel).

The method may further include determining how to unblock the blocked push channel so that when an incoming message (or notification of it) comes through the alternative push channel, the application is able to perform any action it needs to process it and notify the user (by visual, sounds, vibration, for example, or just updating its own UI in preparation for user to turn on the screen later). This typically includes observing the application traffic after unblocking, and re-initiate blocking only after the application has been able to perform its necessary network accesses. Further, the re-blocking needs to take into account the radio state in case existing connections need to be closed, to avoid them causing additional network connections themselves (i.e. start re-blocking only at the next radio-up opportunity).

FIG. 2C depicts a block diagram illustrating examples of additional components of the client-side (or local) proxy of FIG. 2A which is further capable of performing mobile traffic categorization and policy implementation based on application behavior and/or user activity.

In this embodiment of the local proxy 275, the user activity module 215 further includes one or more of, a user activity tracker 215*a*, a user activity prediction engine 215*b*, and/or a user expectation manager 215*c*. The application behavior detect 236 can further include a prioritization engine 241*a*, a time criticality detection engine 241*b*, an application state categorizer 241*c*, and/or an application traffic categorizer 241*d*. The local proxy 275 can further include a backlight detector 219 and/or a network configuration selection engine 251. The network configuration selection engine 251 can further include, one or more of, a wireless generation standard selector 251*a*, a data rate specifier 251*b*, an access channel selection engine 251*c*, and/or an access point selector.

In one embodiment, the application behavior detector 236 is able to detect, determined, identify, or infer, the activity state of an application on the mobile device 250 to which traffic has originated from or is directed to, for example, via the application state categorizer 241*c* and/or the traffic categorizer 241*d*. The activity state can be determined by whether the application is in a foreground or background state on the mobile device (via the application state categorizer 241*c*) since the traffic for a foreground application vs. a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241*a*) and/or is not time-critical (e.g., by the time criticality detection engine 214*b*).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241*a*) and/or as being time critical/time sensitive (e.g., by the time criticality detection engine 241*b*).

The time criticality detection engine 241*b* can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these request are likely to be responded to with the same data.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215*a*. The traffic resulting therefrom can then be categorized appropriately for subsequent processing to determine the policy for handling. Furthermore, user activity can be predicted or anticipated by the user activity prediction engine 215*b*. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215*c* and/or in conjunction with the activity tracker 215 and/or the prediction engine 215*b*) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by the network configuration selection engine 251) on the mobile device 250 in sending traffic between the mobile device and a proxy server (325) and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The network configuration selection engine 251 can select or specify one or more of, a generation standard (e.g., via wireless generation standard selector 251*a*), a data rate (e.g., via data rate specifier 251*b*), an access channel (e.g., access channel selection engine 251*c*), and/or an access point (e.g., via the access point selector 251*d*), in any combination.

For example, a more advanced generation (e.g., 3G, LTE, or 4G or later) can be selected or specified for traffic when the activity state is in interaction with a user or in a foreground on the mobile device. Contrastingly, an older generation standard (e.g., 2G, 2.5G, or 3G or older) can be specified for traffic when one or more of the following is detected, the application is not interacting with the user, the application is running in the background on the mobile device, or the data contained in the traffic is not time critical, or is otherwise determined to have lower priority.

Similarly, a network configuration with a slower data rate can be specified for traffic when one or more of the following is detected, the application is not interacting with the user, the application is running in the background on the mobile device, or the data contained in the traffic is not time critical. The access channel (e.g., Forward access channel or dedicated channel) can be specified.

Figure 3:
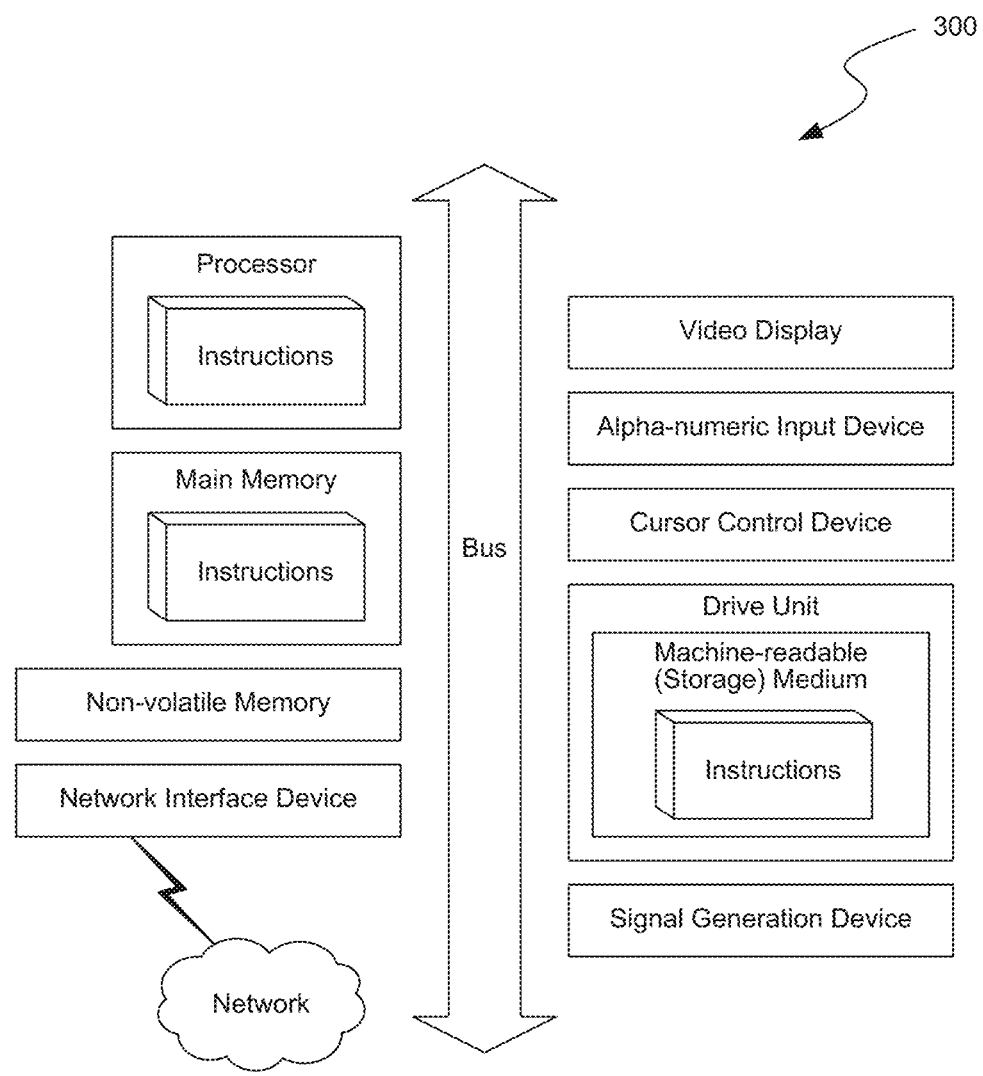
FIG. 3 illustrates a diagrammatic representation of a computer system according to one or more embodiments disclosed herein.

FIG. 3 shows a diagrammatic representation of a machine in the example form of a computer system within which a set of instructions, for causing the machine to perform any one or more of the methodologies discussed herein, may be executed.

In the example of FIG. 3, the computer system 300 includes a processor, memory, non-volatile memory, and an interface device. Various common components (e.g., cache memory) are omitted for illustrative simplicity. The computer system 300 is intended to illustrate a hardware device on which any of the components depicted in the example of FIGS. 2A-2C (and any other components described in this specification) can be implemented. The computer system 300 can be of any applicable known or convenient type. The components of the computer system 300 can be coupled together via a bus or through some other known or convenient device.

One or more methods are disclosed herein. The one or more methods may include determining that a device is communicating over at least two overlapping push channels and blocking one of the push channels to eliminate or reduce overlap between the at least two overlapping push channels. Blocking may include dropping IP packets received from the blocked push channel. Blocking may include rejecting an IP packet received from the blocked push channel. Blocking may include blocking on an application layer for communications received from the blocked push channel. The one or more methods may include determining the state of any existing connections that an application on the device is communicating on. The one or more methods may include, in response to determining the state of an existing connection, closing the application connection. The one or more methods may include receiving a push message from an additional push channel and unblocking the blocked push channel so that the application can perform an action in response to the message from the additional push channel. The one or more methods may include notifying the user of the action. The one or more methods may include re-blocking the unblocked push channel after the action has completed. The one or more methods may include determining that the action is complete and re-blocking the unblocked push channel after the action has completed. The one or more methods may include denying blocking of the push channel until a radio of the mobile device is powered on. The push channels may be proprietary or application specific. Blocking one of the push channels may include blocking a non-common push channel to offload the communication onto a common push channel.

A method of reducing network traffic is provided. The method may include recognizing multiple overlapping push channels at an application, determining that a first push channel of said multiple overlapping push channels can be blocked with minimal user experience impact, blocking the first push channel to reduce network signaling and battery consumption, monitoring application traffic over a second push channel of said multiple overlapping push channels, unblocking the first push channel based on monitored application traffic to service application traffic, and re-blocking the first push channel after the application has serviced application traffic. Recognizing multiple overlapping push channels may be performed offline. Recognizing multiple overlapping push channels may be performed in real time. In one or more embodiments, the first channel may be that of a third party. Blocking may be performed by one of the following: dropping IP packets, rejecting IP packets, and blocking an application layer. Servicing application traffic may include notifying a user.

Provided herein is non-transitory computer readable media containing computer code to implement a processor controlled system for determining that a device is communicating over at least two overlapping push channels and blocking one of the push channels to reduce overlap between the at least two overlapping push channels. The computer code implements a processor controlled system that blocks by dropping IP packets. The computer code implements a processor controlled system that blocks by rejecting IP packets. The computer code implements a processor controlled system that blocks an application layer. The computer code implements a processor controlled system that determines the state of any existing connections that the system is communicating on. The computer code implements a processor controlled system that closes an application connection. The computer code implements a processor controlled system that receives a push message from an additional push channel and unblocks the blocked push channel so that the system can perform an action in response to the message from the additional push channel. The computer code may implement a processor controlled system that notifies the user of the action. The computer code implements a processor controlled system that re-blocks the unblocked push channel after the action has completed. The computer code implements a processor controlled system that determines that the action is complete and re-blocks the unblocked push channel after the action has completed. Non-transitory computer readable media containing computer code to implement a processor controlled system for reducing network traffic is provided and configured for recognizing multiple overlapping push channels at an application, determining that a first push channel of said multiple overlapping push channels can be blocked with minimal user experience impact, blocking the first push channel such that network signaling and battery consumption are reduced, monitoring application traffic over a second push channel of said multiple overlapping push channels, unblocking the first push channel based on application traffic over the second push channel to enable servicing application traffic, and re-blocking the first push channel after the application has performed necessary network access to service the application traffic. Recognizing multiple overlapping push channels may be performed offline. Recognizing multiple overlapping push channels may be performed in real time. At least one of said multiple overlapping push channels may be that of a third party. Blocking may be performed by one of the following: dropping IP packets, rejecting IP packets, and blocking input to an application layer.

A communication network may be provided. The network may include a mobile device having a processor, memory for storing information, and a user interface, the mobile device operating in accord with an operating system and in accord with a push client application. Also provided is a first server, a second server, a host server, a first network operatively connecting said first server and said second server to said host server, and a second network operatively connecting said first network to said mobile device. The push client application controls the processor to cause the mobile device to determine that the first server and the second server produce overlapping first and second push channels and block the first push channel to reduce overlap between the first and second push channels. The mobile device may block the first push channel by dropping IP packets, rejecting IP packets, or blocking an application layer. The processor may further include determining the state of any existing connections that an application on the device is communicating on.

A communication network is provided. The network includes a mobile device having a processor, memory storing an operating system and a push client application, and a user interface. The mobile device operates in accord with the operating system and in accord with the push client application. A first server having a first push channel and a second server having a second push channel that overlaps the first push channel are provided. A host server is provided. A first network operatively connects said first server and the second server to said host server and a second network operatively connects the first network to said mobile device. The push client application controls the processor to determine that the first and second push channels overlap, determine that the first push channel can be blocked with minimal user experience impact, block the first push channel to reduce network signaling and battery consumption, monitor traffic on the second push channel, unblock the first push channel based on traffic on the second push channel, and re-block the first push channel after the push client application has performed necessary network access to service application traffic.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶13, other aspects may likewise be embodied as a means-plus-function claim, or in other forms, such as being embodied in a computer-readable medium. (Any claims intended to be treated under 35 U.S.C. § 112, ¶13 will begin with the words "means for".) Accordingly, the applicant reserves the right to add additional claims after filing the application to pursue such additional claim forms for other aspects of the disclosure.

We claim:

1. A mobile device comprising:
   a memory;
   a processor configured to control the mobile device for:
      communicating over a shared channel and an application specific channel, wherein the application specific channel is a channel for an application on the mobile device to communicate with an application server;

blocking the application specific channel to offload traffic therefrom to the shared channel, wherein the blocking occurs in response to a screen of the mobile device being off and the blocking includes blocking the application from accessing the application server over the application specific channel;

wherein blocking the application from accessing the application server includes suspending the application;

receiving a message directed to the application over the shared channel from a messaging server;

allowing the application to access the application server over the application specific channel in response to receipt of the message;

wherein allowing the application to access the application server includes resuming the application for a period of time; and re-blocking the application specific channel after allowing the application to access the application server over the application specific channel for the period of time.

2. The mobile device of claim 1, wherein suspending the application includes killing the application.

3. The mobile device of claim 1, wherein blocking the application specific channel includes blocking keepalive traffic.

4. The mobile device of claim 3, wherein the blocked keepalive traffic is offloaded to the shared channel.

5. The mobile device of claim 1, wherein the application specific channel is a TCP connection.

6. The mobile device of claim 1, further comprising unblocking the application specific channel when user activity is detected, wherein the user activity includes whether the mobile device is being interacted with.

7. The mobile device of claim 6, wherein the application specific channel that is unblocked is a subsequent TCP connection.

8. The mobile device of claim 1, wherein the screen of the mobile device is off as a result of the mobile device not being interacted with by a user.

9. A non-transient computer readable storage medium containing computer readable program code configured for:

communicating over a shared channel and an application specific channel, wherein the application specific channel is a channel for an application on a mobile device to communicate with an application server;

blocking the application specific channel to offload traffic therefrom to the shared channel, wherein the blocking occurs in response to a screen of the mobile device being off and the blocking includes blocking the application from accessing the application server over the application specific channel;

wherein blocking the application from accessing the application server includes suspending the application;

receiving a message directed to the application over the shared channel from a messaging server;

allowing the application to access the application server over the application specific channel in response to receipt of the message;

wherein allowing the application to access the application server includes resuming the application for a period of time; and re-blocking the application specific channel after allowing the application to access the application server over the application specific channel for the period of time.

10. The computer readable storage medium of claim 9, wherein suspending the application includes killing the application.

11. The computer readable storage medium of claim 9, wherein blocking the application specific channel includes blocking keepalive traffic.

12. The computer readable storage medium of claim 11, wherein the blocked keepalive traffic is offloaded to the shared channel.

13. The computer readable storage medium of claim 9, wherein the application specific channel is a TCP connection.

14. The computer readable storage medium of claim 9, further comprising unblocking the application specific channel when user activity is detected, wherein the user activity includes whether the mobile device is being interacted with.

15. The computer readable storage medium of claim 14, wherein the application specific channel that is unblocked is a subsequent TCP connection.

16. The computer readable storage medium of claim 9, wherein the screen of the mobile device is off as a result of the mobile device not being interacted with by a user.

17. A method comprising:

communicating over a shared channel and an application specific channel, wherein the application specific channel is a channel for an application on a mobile device to communicate with an application server;

blocking the application specific channel to offload traffic therefrom to the shared channel, wherein the blocking occurs in response to a screen of the mobile device being off and the blocking includes blocking the application from accessing the application server over the application specific channel;

wherein blocking the application from accessing the application server includes suspending the application;

receiving a message directed to the application over the shared channel from a messaging server;

allowing the application to access the application server over the application specific channel in response to receipt of the message;

wherein allowing the application to access the application server includes resuming the application for a period of time; and re-blocking the application specific channel after allowing the application to access the application server over the application specific channel for the period of time.

* * * * *